(12) United States Patent
Kojima et al.

(10) Patent No.: US 7,390,381 B2
(45) Date of Patent: Jun. 24, 2008

(54) INFORMATION RECORDING MEDIUM AND METHOD OF MANUFACTURING THE SAME

(75) Inventors: Rie Kojima, Kadoma (JP); Noboru Yamada, Hirakata (JP); Takashi Nishihara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 615 days.

(21) Appl. No.: 10/734,711

(22) Filed: Dec. 12, 2003

(65) Prior Publication Data

US 2004/0126533 A1   Jul. 1, 2004

Related U.S. Application Data

(62) Division of application No. 09/801,977, filed on Mar. 8, 2001, now Pat. No. 6,689,445.

(30) Foreign Application Priority Data

Mar. 10, 2000  (JP)  ............................. 2000-066861

(51) Int. Cl.
  *C23C 14/35*  (2006.01)
  *C23C 16/00*  (2006.01)
(52) U.S. Cl. ............................. 204/192.2; 204/192.12; 204/192.15; 427/127; 427/128; 427/585; 427/593; 427/255.31; 427/255.35
(58) Field of Classification Search .............. 204/192.2, 204/192.12, 192.15; 427/127, 128, 585, 427/593, 248.1, 255.23, 255.29, 255.31, 427/255.35

See application file for complete search history.

(56) References Cited

U.S. PATENT DOCUMENTS

| 4,621,032 | A | * | 11/1986 | deNeufville et al. | ........ 428/688 |
| 6,033,535 | A | * | 3/2000 | Ohno et al. | .............. 204/192.2 |
| 6,132,932 | A | | 10/2000 | Miyamoto et al. | |
| 6,153,355 | A | | 11/2000 | Takahashi et al. | |
| 6,329,036 | B1 | * | 12/2001 | Kikukawa et al. | .......... 428/64.1 |
| 6,406,771 | B1 | | 6/2002 | Nakakuki et al. | |
| 6,477,135 | B1 | | 11/2002 | Uno et al. | |

(Continued)

FOREIGN PATENT DOCUMENTS

JP    63-121142    5/1988

(Continued)

OTHER PUBLICATIONS

1971, Hiroshi Kutoba "Wave optics" Chapter 3, pp. 199-236.

(Continued)

*Primary Examiner*—Rodney G. McDonald
(74) *Attorney, Agent, or Firm*—Hamre, Schumann, Mueller & Larson, P.C.

(57) ABSTRACT

An information recording medium that is excellent in repeated-rewriting performance and is deteriorated less in crystallization sensitivity with time is provided, with respect to which high density recording can be carried out. A method of manufacturing the same also is provided. The information recording medium includes a substrate and a recording layer disposed above the substrate. The recording layer contains, as constituent elements, Ge, Sb, Te, Sn, and at least one element M selected from Ag, Al, Cr, Mn, and N and is transformed in phase reversibly between a crystal phase and an amorphous phase by an irradiation of an energy beam.

5 Claims, 3 Drawing Sheets

U.S. PATENT DOCUMENTS 6,607,869 B1  8/2003  Kojima et al.

FOREIGN PATENT DOCUMENTS

| JP | 64-70940  | 3/1989 |
| JP | 2-147289  | 6/1990 |
| JP | 7-223372  | 8/1995 |
| JP | 11-58962  | 3/1999 |

OTHER PUBLICATIONS

1998, Osato et al. "A rewritable optical disk system with over 10 GB of capacity" SPIE vol. 3401, pp. 80-86.

* cited by examiner

INFORMATION RECORDING MEDIUM AND METHOD OF MANUFACTURING THE SAME

This application is a divisional of application Ser. No. 09/801,977, filed Mar. 8, 2001, which application(s) are incorporated herein by reference.

BACKGROUND OF THE INVENTION

1. Field of the Invention

The present invention relates generally to an information recording medium with respect to which information can be optically recorded, erased, rewritten, and reproduced, and to a method of manufacturing the same.

2. Related Background Art

In a phase-change information recording medium, information is recorded, erased, and rewritten using a recording layer that is transformed in phase reversibly between a crystal phase and an amorphous phase. When this recording layer is irradiated with a high power laser beam and then is cooled rapidly, a portion thus irradiated is changed to be in an amorphous state and as a result, a recording mark is formed. Similarly, when an amorphous portion of the recording layer is irradiated with a low power laser beam and then is cooled slowly, the portion thus irradiated is changed to be in a crystal phase and as a result, a recording mark is erased. Therefore, in the phase-change information recording medium, the recording layer is irradiated with laser beams having powers modulated between a high power level and a low power level, so that new information can be rewritten while previous information is erased.

When information is to be rewritten, atoms move within the recording layer as the recording layer is transformed in phase between the crystal phase and the amorphous phase. As a result, in a conventional information recording medium, when rewriting is repeated, atoms may be concentrated locally to vary the thickness of the recording layer and this may cause deterioration in signal quality in some cases. Such repeated-rewriting performance is deteriorated particularly with the increase in recording density. The reason is that when the recording density increases, the intervals between adjacent recording marks are shortened and therefore the influence of the concentration of atoms in the adjacent recording marks increases.

In order to prevent the repeated-rewriting performance from being deteriorated, it is necessary to reduce the thickness of the recording layer to suppress the atom movement. In addition, the reduction in thickness of the recording layer also is a technique required to obtain a high density information recording medium with two recording layers. However, the reduction in thickness of the recording layer makes it difficult for atoms to move. Therefore, the crystallization rate of the recording layer decreases. The decrease in crystallization rate results in the deterioration in signal quality in a high density information recording medium in which small recording marks must be recorded in a short time. In addition, when the crystallization rate decreases, deterioration in crystallization sensitivity with time and that in erasing rate with time tend to occur. In other words, with the increase in recording density, it becomes difficult to achieve both the improvement in the repeated-rewriting performance and the suppression of the deterioration in crystallization sensitivity with time.

In order to improve the repeated-rewriting performance, a recording layer containing Te, Ge, Sn, and Sb has been reported (see JP 2(1990)-147289 A).

In the above-mentioned conventional recording layer, however, the crystallization rate was high but the repeated-rewriting performance and long-term reliability of the crystallization sensitivity in high density recording were not sufficiently high.

SUMMARY OF THE INVENTION

Therefore, with the foregoing in mind, it is an object of the present invention to provide an information recording medium that allows high density recording to be carried out, is excellent in repeated-rewriting performance, and is deteriorated less in crystallization sensitivity with time, and to provide a method of manufacturing the same.

In order to achieve the above-mentioned object, an information recording medium of the present invention includes a substrate and a recording layer disposed above the substrate. The recording layer contains, as constituent elements, Ge, Sb, Te, Sn, and at least one element M selected from Ag, Al, Cr, Mn, and N. The term "constituent element" denotes an element indispensable for allowing a property of a material containing the element to be expressed. It is preferable that the recording layer consists essentially of Ge, Sb, Te, Sn, and at least one element M. The recording layer is transformed in phase reversibly between a crystal phase and an amorphous phase by an irradiation of energy beams. According to the information recording medium, it is possible to obtain an information recording medium that allows high density recording to be carried out, is excellent in the repeated-rewriting performance, and is deteriorated less in crystallization sensitivity with time.

In the above-mentioned information recording medium, the recording layer may be formed of a material expressed by a composition formula of

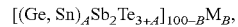

$$[(Ge, Sn)_A Sb_2 Te_{3+A}]_{100-B} M_B,$$

where $0 < A \leq 10$ and $0 < B \leq 20$. When $A \leq 10$, the repeated-rewriting performance can be prevented from deteriorating. When $B \leq 20$, the deterioration in crystallization sensitivity with time can be prevented from worsening.

In the above-mentioned information recording medium, the content of Sn in the recording layer may be 2 atom. % to 20 atom. %. When the Sn content is set to be at least 2 atom. %, a sufficiently high crystallization rate can be obtained. In addition, when the Sn content is set to be not more than 20 atom. %, it is possible to increase the ratio of a quantity of reflected light when the recording layer is in a crystal phase to a quantity of reflected light when the recording layer is in an amorphous phase.

In the above-mentioned information recording medium, the recording layer may have a thickness of 5 nm to 15 nm. When the thickness of the recording layer is set to be at least 5 nm, the recording layer can be changed to be in a crystal phase easily. In addition, when the thickness of the recording layer is set to be not more than 15 nm, the repeated-rewriting performance can be prevented from deteriorating.

The information recording medium further may include a first protective layer, a second protective layer, and a reflective layer. The first protective layer, the recording layer, the second protective layer, and the reflective layer may be formed sequentially on the substrate. In this case, the information recording medium further may include an interface layer disposed in at least one position selected from a position between the first protective layer and the recording layer and a position between the second protective layer and the recording layer. Furthermore, the information recording medium further may include an optical absorption compensation layer disposed between the second protective layer and the reflective layer.

The information recording medium further may include a first protective layer, a second protective layer, and a reflective layer. The reflective layer, the second protective layer, the recording layer, and the first protective layer may be formed sequentially on the substrate. According to the above-mentioned configuration, an information recording medium can be obtained that allows particularly high density recording to be carried out. In this case, the information recording medium further may include an interface layer disposed in at least one position selected from a position between the first protective layer and the recording layer and a position between the second protective layer and the recording layer. Moreover, the information recording medium further may include an optical absorption compensation layer disposed between the reflective layer and the second protective layer.

A method of manufacturing an information recording medium according to the present invention is directed to a method of manufacturing an information recording medium provided with a substrate and a recording layer disposed above the substrate. The method includes forming the recording layer by a vapor deposition method. The recording layer contains, as constituent elements, Ge, Sb, Te, Sn, and at least one element M selected from Ag, Al, Cr, Mn, and N. The recording layer is transformed in phase reversibly between a crystal phase and an amorphous phase by an irradiation of energy beams. According to the manufacturing method, an information recording medium of the present invention can be manufactured easily.

In the above-mentioned manufacturing method, the vapor deposition method may be at least one method selected from a vacuum evaporation method, a sputtering method, an ion plating method, a chemical vapor deposition, and a molecular beam epitaxy.

In the above-mentioned manufacturing method, the vapor deposition method may be a sputtering method using a gas containing at least one gas selected from nitrogen gas and oxygen gas and one rare gas selected from argon and krypton.

In the manufacturing method, the recording layer may be deposited at a deposition rate of 0.5 nm/sec to 5 nm/sec. According to the configuration described above, a recording layer in the amorphous state can be deposited.

In the manufacturing method, the recording layer may have a thickness of 5 nm to 15 nm.

DETAILED DESCRIPTION OF THE INVENTION

Embodiments of the present invention are described with reference to the drawings as follows.

Embodiment 1

In Embodiment 1, the description is directed to an example of an information recording medium according to the present invention.

Figure 1:
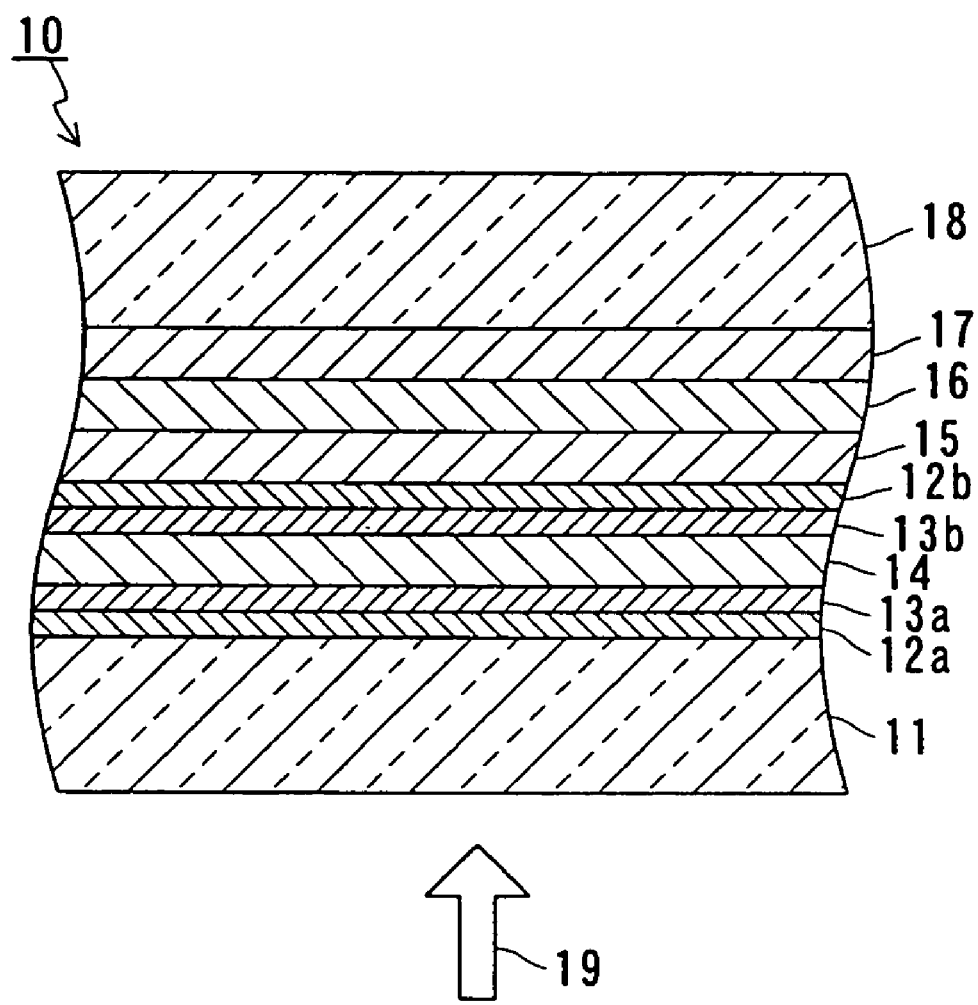
FIG. 1 is a partial sectional view showing an example of an information recording medium according to the present invention.

FIG. 1 shows a partial sectional view of an information recording medium 10 according to Embodiment 1. The information recording medium 10 includes: a substrate 11; a first protective layer 12a, a first interface layer 13a, a recording layer 14, a second interface layer 13b, a second protective layer 12b, an optical absorption compensation layer 15, and a reflective layer 16, which are laminated sequentially on the substrate 11; and a dummy substrate 18 bonded to the reflective layer 16 with an adhesive layer 17. In other words, the information recording medium 10 is provided with the substrate 11 and the recording layer 14 disposed above the substrate 11. The information recording medium 10 is irradiated with energy beams (generally, laser beams) 19 for recording and reproduction from the substrate 11 side.

The recording layer 14 is transformed in phase reversibly between a crystal phase and an amorphous phase by the irradiation of the energy beams 19. Specifically, an irradiation of a high power energy beam 19 allows a crystal phase portion of the recording layer 14 to change to an amorphous phase. An irradiation of a low power energy beam 19 allows an amorphous phase portion of the recording layer 14 to change to a crystal phase. Preferably, the recording layer 14 has a thickness of 5 nm to 15 nm.

The recording layer 14 contains, as constituent elements, Ge, Sb, Te, Sn, and at least one element M selected from Ag, Al, Cr, Mn, and N. Specifically, materials can be used that are expressed by a composition formula of

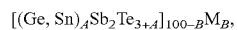

$[(Ge, Sn)_A Sb_2 Te_{3+A}]_{100-B} M_B$, wherein $0 < A \leq 10$ and $0 < B \leq 20$. This composition formula indicates that Ge and Sn are contained in a total amount of $[(100-B) \cdot A]/(2A+5)$ atom. % in the recording layer 14. It is more preferable that A and B satisfy $2 \leq A \leq 8$ and $2 \leq B \leq 15$, respectively. In the materials expressed by this composition formula, it is preferable that the Sn content is 2 atom. % to 20 atom. %.

The materials expressed by the above-mentioned composition formula can be defined as materials prepared by substitution of part of Ge in a GeTe—$Sb_2Te_3$ pseudobinary composition by Sn and addition of an element M thereto. The GeTe—$Sb_2Te_3$ pseudobinary composition has been used as a material with a high crystallization rate. In this material, SnTe or PbTe is solved, so that the crystallization rate further can be increased. Both SnTe and PbTe have a rock-salt crystal structure like the GeTe—$Sb_2Te_3$ pseudobinary. In addition, SnTe and PbTe have high crystallization rates and are solved with Ge—Sb—Te easily. Particularly, SnTe is preferable as a material to be solved in a GeTe—$Sb_2Te_3$ pseudobinary composition.

For instance, it is preferred to use GeTe—SnTe—$Sb_2Te_3$, which can be obtained by the mixture of SnTe with GeTe—$Sb_2Te_3$ pseudobinary composition, as the material of the recording layer 14. In this case, when part of Ge is substituted by Sn and thus (Ge,Sn)Te—$Sb_2Te_3$ is obtained, the crystallization rate further increases.

The element M contained in the recording layer 14 is considered as having a function of suppressing the atom movement. The use of two elements of Al and Ag, Cr and Ag, or Mn and Ag as the element M can improve the repeated-rewriting performance, suppress the deterioration in crystallization sensitivity with time, and increase a signal amplitude. However, when the concentration of the element M or the number of elements is to be increased, it is preferred to increase the Sn concentration in the recording layer 14 to prevent the crystallization rate from being reduced. Preferably, the concentration of the element M is equal to or lower than the Sn concentration.

The substrate 11 is a disc-like transparent substrate. As the material of the substrate 11, for example, resins such as amorphous polyolefin or polymethyl methacrylate (PMMA) or glass can be used. At the surface of the substrate 11 on the recording layer 14 side, guide grooves for guiding the energy beams 19 may be formed. The surface of the substrate 11 on the energy beam 19 incident side is smooth and flat in general. The substrate has a thickness of, for instance, about 0.5 mm to 1.3 mm.

The first and second protective layers 12a and 12b have a function of protecting the recording layer 14. The thicknesses of the first and second protective layers 12a and 12b are adjusted, so that the quantity of incident light on the recording layer 14 can be increased and the signal amplitude (the variation in quantity of reflected light before and after recording) also can be increased. The thickness of the protective layers can be determined by calculation based on, for example, a matrix method (see, for instance, Chapter 3 in "Wave Optics" by Hiroshi Kubota, published by Iwanami Shinsho, 1971). With this calculation, the thickness of the protective layers can be determined so that a considerable difference is obtained between the quantity of the light reflected from the recording layer 14 in a crystalline state and that reflected from the recording layer 14 in an amorphous state and so that the quantity of incident light on the recording layer 14 is increased.

The first and second protective layers 12a and 12b are formed of, for example, dielectrics. Specifically, materials used for the first and second protective layers 12a and 12b include oxides such as $SiO_2$ and $Ta_2O_5$, nitrides such as Si—N, Al—N, Ti—N, Ta—N, Zr—N, or Ge—N, sulfides such as ZnS, or carbides such as SiC. In addition, mixtures of such materials also can be used. Among them, ZnS—$SiO_2$ as a mixture of ZnS and $SiO_2$ is a particularly good material. The mixture ZnS—$SiO_2$ is an amorphous material, has a high refractive index, and is excellent in mechanical properties and moisture resistance. Furthermore, the mixture ZnS—$SiO_2$ can be deposited at a high deposition rate. The first and second protective layers 12a and 12b may be formed of the same material or different materials.

The first and second interface layers 13a and 13b are disposed between the first protective layer 12a and the recording layer 14 and between the second protective layer 12b and the recording layer 14, respectively. The first and second interface layers 13a and 13b have a function of preventing material migration occurring between the first protective layer 12a and the recording layer 14 and between the second protective layer 12b and the recording layer 14. Materials that can be used for the first and second interface layers 13a and 13b include, for example, nitrides such as Si—N, Al—N, Zr—N, Ti—N, Ge—N, or Ta—N, nitride oxides containing them, or carbide such as SiC. In order to obtain excellent recording/erasing performance, preferably, the first and second interface layers 13a and 13b have a thickness in the range of 1 nm to 10 nm, and more preferably in the range of 2 nm to 5 nm.

In the optical absorption compensation layer 15, the ratio of the optical absorptance when the recording layer 14 is in a crystalline state to that when the recording layer 14 is in an amorphous state is adjusted. The optical absorption compensation layer 15 can prevent recording mark shapes from being distorted in rewriting. It is preferred to use a material having a high refractive index and absorbing light appropriately as the material of the optical absorption compensation layer 15. For instance, a material with a refractive index n of 3 to 6 and an extinction coefficient k of 1 to 4 can be used. Specifically, an amorphous Ge alloy such as Ge—Cr or Ge—Mo, or an amorphous Si alloy such as Si—Cr, Si—Mo, or Si—W can be used. In addition, it also is possible to use crystalline metal, semi-metal, or a semiconductor material, such as a Si alloy, a telluride, Ti, Zr, Nb, Ta, Cr, Mo, W, SnTe, or PbTe.

The reflective layer 16 has a function of increasing the quantity of light to be absorbed in the recording layer 14. In addition, the formation of the reflective layer 16 allows heat generated in the recording layer 14 to be diffused quickly to facilitate the transformation in phase of the recording layer 14 to the amorphous phase. Furthermore, when the reflective layer 16 is formed, laminated layers can be protected from an operating environment.

A single-element metal with high thermal conductivity such as, for example, Al, Au, Ag, or Cu, can be used as the material of the reflective layer 16. Alloys also may be used, including Al—Cr, Al—Ti, Ag—Pd, Ag—Pd—Cu, Ag—Pd—Ti, or the like. In such alloys, their compositions are varied, so that the moisture resistance and thermal conductivity can be adjusted. Furthermore, it may be possible to omit the reflective layer 16 depending on the material of the recording layer 14 and information recording conditions.

The adhesive layer 17 is used for bonding the dummy substrate 18 to the reflective layer 16. The adhesive layer 17 is formed of a material with a high thermal resistance and high adhesiveness. For example, resins such as ultraviolet curable resins or the like can be used for the adhesive layer 17. Specifically, a material containing acrylic resin or epoxy resin as a main component can be used. The adhesive layer 17 also may be formed using a resin film, a dielectric film, a double sided tape or combinations thereof.

The dummy substrate 18 is a disc-like substrate. The dummy substrate 18 has a function of improving the mechanical strength of the information recording medium 10. The dummy substrate 18 protects the laminated layers. The materials described with respect to the substrate 11 can be used for the dummy substrate 18. The material of the dummy substrate 18 may be the same as or different from that of the substrate 11. In addition, the thickness of the dummy substrate 18 may be the same as or different from that of the substrate 11.

In the information recording medium 10 according to Embodiment 1, the recording layer 14 contains the elements M, Ge, Sb, Te, and Sn as constituent elements. According to the information recording medium 10, therefore, an information recording medium can be obtained that allows high density recording to be carried out, is excellent in the repeated-rewriting performance, and is deteriorated less in crystallization sensitivity with time.

In Embodiment 1, the information recording medium 10 with one recording layer 14 was described. However, the information recording medium of the present invention may be provided with two recording layers 14 (the same holds true in the following embodiments). For example, two information recording media 10 are laminated using an adhesive layer with their respective dummy substrates 18 adhering to each other, so that a two-sided information recording medium can be obtained.

Embodiment 2

In Embodiment 2, another example of an information recording medium of the present invention is described. The same portions as those described in Embodiment 1 are indicated with the same numerals and the duplicate descriptions will be omitted (the same holds true in the following embodiment).

Figure 2:
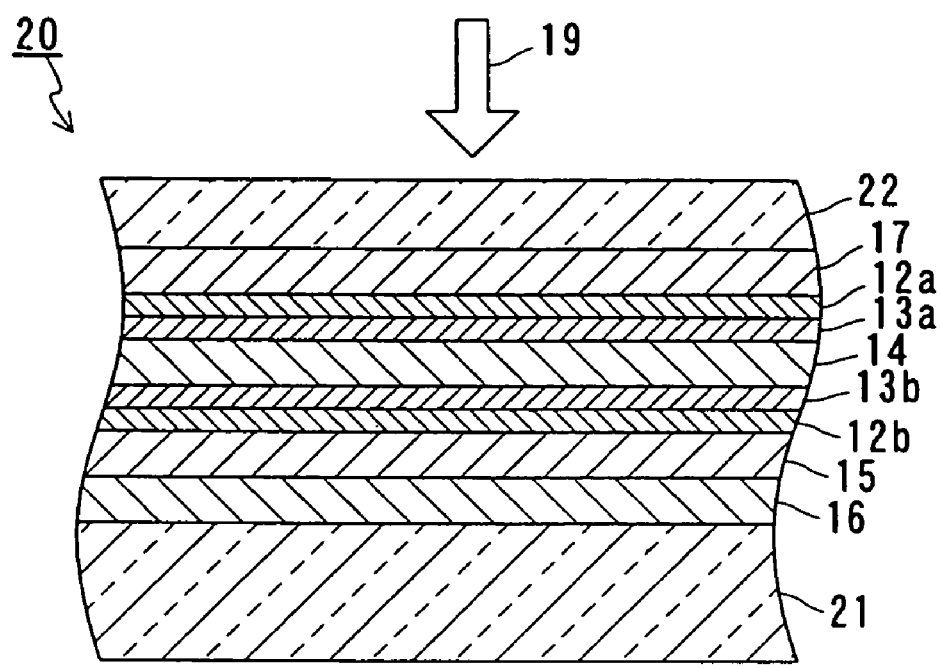
FIG. 2 is a partial sectional view showing another example of an information recording medium according to the present invention.

FIG. 2 shows a partial sectional view of an information recording medium 20 according to Embodiment 2. The information recording medium 20 includes: a first substrate 21; a reflective layer 16, an optical absorption compensation layer 15, a second protective layer 12b, a second interface layer 13b, a recording layer 14, a first interface layer 13a, and a first protective layer 12a, which are laminated sequentially on the first substrate 21; and a second substrate 22 bonded to the first protective layer 12a with an adhesive layer 17. In other words, the information recording medium 20 is provided with the first substrate 21 and the recording layer 14 disposed above the first substrate 21. The information recording medium 20 is irradiated with energy beams (generally, laser beams) 19 for recording and reproduction from the second substrate 22 side.

The same substrate as the substrate 11 can be used for the first substrate 21. The second substrate is a transparent disc-like substrate and can be formed of the same material as that of the substrate 11. At the surface of the second substrate 22 on the recording layer 14 side, guide grooves for guiding the energy beams 19 may be formed. Particularly, it is preferable that the surface of the second substrate 22 on the energy beam 19 incident side is smooth and flat. The second substrate 22 is thinner than the first substrate 21 and has a thickness of, for example, about 0.05 mm to 0.5 mm.

In the information recording medium 20, since the second substrate 22 is thinner than the first substrate 21, the numerical aperture of an objective lens can be increased. In this case, a beam spot size w can be given by:

$$w = k \cdot \lambda / NA,$$

wherein $\lambda$ denotes a wavelength of the energy beams 19, NA represents the numerical aperture of the objective lens, and k is a constant. The spot size w is reduced with the decrease in the wavelength and with increase in the numerical aperture NA. Therefore, in the information recording medium 20 allowing the numerical aperture of the objective lens to be increased, higher density recording is possible as compared to the case of the information recording medium 10. It has been reported that, for instance, an objective lens with a NA of 0.6 can be used when the substrate has a thickness of 0.6 mm, and an objective lens with a NA of 0.85 can be used when the substrate has a thickness of 0.1 mm (Kiyoshi Osato, "A Rewritable Optical Disk System with over 10GB of Capacity", Proc. SPIE. Optical Data Storage'98, 3401, 80-86 (1998)).

In the information recording medium 20, the recording layer 14 made of the material described with respect to the information recording medium 10 is used, so that the same effect as in the information recording medium 10 can be obtained.

Embodiment 3

In Embodiment 3, a method of manufacturing an information recording medium 10 is described as an example of a method according to the present invention. As described below, the manufacturing method according to Embodiment 3 includes a step of forming a recording layer 14 by a vapor deposition method.

First, a substrate 11 is prepared and is placed in deposition equipment. Single wafer deposition equipment with one power source in one vacuum chamber or in-line deposition equipment with a plurality of power sources in one vacuum chamber can be employed as the deposition equipment used in Embodiment 3. The following respective layers may be deposited using the same or different deposition equipment.

A first protective layer 12a, a first interface layer 13a, a recording layer 14, a second interface layer 13b, a second protective layer 12b, an optical absorption compensation layer 15, and a reflective layer 16 are formed sequentially on the substrate 11. When grooves for guiding energy beams 19 are formed at the surface of the substrate 11, the first protective layer 12a is formed on the surface with the grooves.

The first protective layer 12a, the first interface layer 13a, the second interface layer 13b, and the second protective layer 12b can be formed by, for instance, a sputtering method. Specifically, a base material made of a compound may be sputtered in an Ar gas atmosphere or an atmosphere of a gas mixture of an Ar gas and a reactant gas. A reactive sputtering method also may be used in which a base material made of metal is sputtered in an atmosphere of a gas mixture of an Ar gas and a reactant gas.

The recording layer 14 is made of the material described in Embodiment 1 and is formed by a vapor deposition method. At least one selected from a vacuum evaporation method, a sputtering method, an ion plating method, a chemical vapor deposition, and a molecular beam epitaxy can be used as the vapor deposition method.

For example, the recording layer 14 can be formed by a sputtering method using a gas mixture containing at least one gas selected from nitrogen gas and oxygen gas and one rare gas selected from argon and krypton. Examples of the gas mixture include a gas mixture of nitrogen gas and argon, a gas mixture of nitrogen gas and krypton, or gas mixtures containing oxygen gas added thereto. Specifically, a base material (target) containing Ge, Sb, Te, Sn, and an element M is sputtered in the gas mixture atmosphere described above, so that the recording layer 14 can be formed. Five base materials corresponding to Ge, Sb, Te, Sn, and the element M, respectively, or a binary or ternary base material obtained by combination of some elements may be used as the base material. When the element M consists of nitrogen alone, a target containing Ge, Sb, Te, and Sn is sputtered in an atmosphere containing nitrogen gas, so that the recording layer 14 can be formed.

The sputtering method allows easy formation of a recording layer expressed by

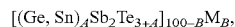

wherein $0 < A \leqq 10$ and $0 < B \leqq 20$.

Preferably, the recording layer 14 is deposited at a deposition rate of 0.5 nm/sec to 5 nm/sec (more preferably, 0.8 nm/sec to 3 nm/sec).

After the formation of the second protective layer 12b, the optical absorption compensation layer 15 and the reflective layer 16 are formed on the second protective layer 12b. The optical absorption compensation layer 15 and the reflective layer 16 can be formed by sputtering of base materials made of metals in an Ar gas atmosphere.

Next, the adhesive layer 17 is formed on the reflective layer 16 and the reflective layer 16 and the dummy substrate 18 are bonded to each other. Thus, the information recording medium 10 can be manufactured. An initialization step for crystallizing the whole recording layer 14 may be carried out as required. The initialization step can be carried out before or after the dummy substrate 18 is bonded.

The information recording medium 20 also can be manufactured by the same method as in the case of the information recording medium 10. The respective layers of the information recording medium 20 can be formed by the same methods as in the case of the information recording medium 10. Furthermore, the second substrate 22 can be bonded to the first protective layer 12a with the adhesive layer 17 as in the case of the dummy substrate 18. Similarly in the method of manufacturing the information recording medium 20, the initialization step is carried out as required. The initialization step can be carried out before or after the second substrate 22 is bonded. In the information recording medium 20, the energy beams 19 are incident on the second substrate side 22, and therefore it is preferable that the thickness of the adhesive layer 17 is uniform throughout.

According to the manufacturing method of Embodiment 3, information recording media of the present invention can be manufactured easily.

EXAMPLES

The present invention is described further in detail using examples as follows.

Example 1

In Example 1, an example of the information recording medium 10 is described. The following description is directed to a method of manufacturing an information recording medium according to Example 1.

First, a polycarbonate substrate (with a thickness of 0.6 mm) with a spiral guide groove formed at its one surface was prepared as the substrate 11. A ZnS—SiO$_2$ layer (the first protective layer 12a, with a thickness of 140 nm), a Ge—N layer (the first interface layer 13a, with a thickness of 5 nm), a recording layer (the recording layer 14), a Ge—N layer (the second interface layer 13b, with a thickness of 3 nm), a ZnS—SiO$_2$ layer (the second protective layer 12b, with a thickness of 40 nm), a GeCr layer (the optical absorption compensation layer 15, with a thickness of 40 nm), and a Ag alloy layer (the reflective layer 16, with a thickness of 80 nm) were formed sequentially on the polycarbonate substrate by the sputtering method. The thicknesses of the first protective layer 12a and the second protective layer 12b were adjusted so that a larger signal amplitude (variation in quantity of reflected light) in a wavelength of 660 nm and a larger quantity of incident light on the recording layer can be obtained. These thicknesses were determined using the calculation based on the matrix method.

The recording layer was formed using a material expressed by a composition formula of $[(Ge, Sn)_4Sb_2Te_7]_{95}N_5$. This recording layer contains Ge and Sn in a total amount of $95 \times 4/(4+2+7) \leqq 29$ atom. %. Specifically, the Ge content and the Sn content were set to be 24 atom. % and 5 atom. %, respectively.

Afterward, an ultraviolet curable resin was spin-coated on the Ag alloy layer to form the adhesive layer 17. Finally, a dummy substrate (with a thickness of 0.6 mm) was allowed to adhere to the Ag alloy layer, which then was irradiated with ultraviolet rays. Thus, the Ag alloy layer and the dummy substrate were bonded.

In Example 1, the whole information recording medium was irradiated with the laser beams after the dummy substrate was bonded, so that the whole recording layer was crystallized. Thus, an information recording medium according to Example 1 was produced. In Example 1, eight types of information recording media 10-11 to 10-18 having recording layers with different thicknesses were produced.

On the other hand, information recording media were produced as comparative examples in the same manner as in the above-mentioned example except that the materials of the recording layers were changed. In these comparative examples, the recording layers were formed with a material expressed by a composition formula of $Ge_4Sb_2Te_7$. Similarly in the comparative examples, eight types of information recording media C-11 to C-18 having the recording layers with different thicknesses were produced.

With respect to the above-mentioned 16 types of information recording media, the repeated-rewriting performance and the deterioration in crystallization sensitivity with time were evaluated. The methods of evaluating them are described later. The evaluation results are shown in Table 1.

TABLE 1

| Information Recording Medium No. | Thickness of Recording Layer [nm] | Rewritable Number of Times | Variation in Jitter Value [%] |
|---|---|---|---|
| 10-11 | 3 | E1 | E2 |
| 10-12 | 5 | C1 | C2 |
| 10-13 | 7 | A1 | B2 |
| 10-14 | 9 | A1 | B2 |
| 10-15 | 11 | B1 | A2 |
| 10-16 | 13 | B1 | A2 |
| 10-17 | 15 | C1 | A2 |
| 10-18 | 17 | C1 | A2 |
| C-11 | 3 | E1 | E2 |
| C-12 | 5 | E1 | E2 |
| C-13 | 7 | B1 | D2 |
| C-14 | 9 | B1 | D2 |
| C-15 | 11 | C1 | C2 |
| C-16 | 13 | C1 | C2 |
| C-17 | 15 | D1 | B2 |
| C-18 | 17 | D1 | B2 |

$200000 \leqq A1$
$0 \leqq A2 < 1$
$100000 \leqq B1 < 200000$
$1 \leqq B2 \leqq 2$
$10000 \leqq C1 < 100000$
$2 < C2 < 3$
$D1 < 10000$
$3 \leqq D2$
E1: Unrewritable
E2: Unevaluable In Table 1, larger "Rewritable Number of Times" indicates better repeated-rewriting performance. A1 to D1 represent the ranges described in the bottom of Table 1, respectively. E1 denotes that no rewriting was possible. In Table 1, smaller "Variation in Jitter Value" indicates less deterioration in crystallization sensitivity with time. A2 to D2 represent the ranges described in the bottom of Table 1. E2 denotes that no evaluation was possible because the jitter values before a shelf test exceeded 13% both between leading edges of recording marks and between end edges of the recording marks. A1 to E1 and A2 to E2 in the following tables also indicate the same meanings as in the above.

As shown in Table 1, none of the information recording media C-11 to C-18 of the comparative examples showed the characteristics A or B both in the rewritable number of times and variation in jitter value. On the other hand, the information recording media 10-13 to 10-16 of Example 1 showed the characteristics A or B both in the rewritable number of times and variation in jitter value.

On the average, the information recording media of Example 1 were excellent in the repeated-rewriting performance and were less deteriorated in crystallization sensitivity with time as compared to the comparative examples C-11 to C-18. It is conceivable that the improvement in the repeated-rewriting performance resulted from the addition of nitrogen. In addition, it also is conceivable that the deterioration in crystallization sensitivity with time was suppressed because of the increase in crystallization rate due to the substitution of part of Ge in $Ge_4Sb_2Te_7$ by Sn.

Example 2

In Example 2, the description is directed to an example in which the information recording medium 10 was produced with the Sn content in the recording layer being varied.

Information recording media were produced as in Example 1 except that the thickness of the recording layers was set to be 7 nm and the Sn contents in the recording layers were varied. In the information recording media of Example 2, the recording layers were formed using a material expressed by a composition formula of $[(Ge, Sn)_4Sb_2Te_7]_{95}N_5$. Eight types of information recording media 10-21 to 10-28 were produced with the Sn content varied between 2 atom. % to 25 atom. % and the Ge content varied between 27 atom. % to 4 atom. %. The information recording medium 10-22 is identical with the information recording medium 10-13. In addition, an information recording medium C-21 that is free from Sn also was produced as a comparative example.

With respect to the information recording media 10-21 to 28 and C-21, the variations in jitter value were measured by the method described later and thus the deterioration in crystallization sensitivity with time was evaluated. The evaluation results are shown in Table 2.

TABLE 2

| Information Recording Medium No. | Ge/Sn Contents in Recording Layer | | Variation in Jitter Value [%] |
|---|---|---|---|
| | Ge[atom. %] | Sn[atom. %] | |
| 10-21 | 27 | 2 | C2 |
| 10-22 | 24 | 5 | B2 |
| 10-23 | 22 | 7 | B2 |
| 10-24 | 19 | 10 | A2 |
| 10-25 | 14 | 15 | A2 |
| 10-26 | 9 | 20 | A2 |
| 10-27 | 6 | 23 | E2 |
| 10-28 | 4 | 25 | E2 |
| C-21 | 29 | 0 | D2 |

As shown in Table 2, excellent characteristics were obtained when the Sn content was in the range between 2 atom. % and 20 atom. %.

Example 3

In Example 3, the description is directed to an example in which the information recording medium 10 was produced with the element M being varied.

Information recording media were produced as in Example 1 except that the element M was varied and the thickness of the recording layers was set to be 11 nm. In the information recording media of Example 3, the recording layers were formed using a material expressed by a composition formula of $[(Ge, Sn)_4Sb_2Te_7]_{95}M_5$. The Ge content was set to be 24 atom. % and the Sn content to be 5 atom. %. In Example 3, five types of information recording media 10-31 to 10-35 were produced using Mn, Ag, Cr, Al, or N as the element M. In addition, an information recording medium C-31 that is free from the element M also was produced as a comparative example.

With respect to the information recording media 10-31 to 35 and C-31, the repeated-rewriting performance was evaluated by the method described later. The evaluation results are shown in Table 3.

TABLE 3

| Information Recording Medium No. | Element M | Rewritable Number of Times |
|---|---|---|
| 10-31 | Mn | 150000 |
| 10-32 | Ag | 90000 |
| 10-33 | Cr | 160000 |
| 10-34 | Al | 180000 |
| 10-35 | N | 150000 |
| C-31 | None | 70000 |

As shown in Table 3, the use of Mn, Ag, Cr, Al, or N as the element M allowed the rewriting performance to improve. This effect was quite large, particularly when Mn, Cr, Al, or N was used. In addition, when Ag was used as the element M, the signal amplitude increased and thus the jitter values between leading edges of recording marks and between end edges of the recording marks were increased.

Example 4

In Example 4, the description is directed to an example in which the information recording medium 10 was produced using Mn as the element M.

Information recording media were produced as in Example 1 except for using Mn as the element M. In the information recording media of Example 4, the recording layers were formed using a material expressed by a composition formula of $[(Ge, Sn)_4Sb_2Te_7]_{95}Mn_5$. The Ge content was set to be 24 atom. % and the Sn content to be 5 atom. %. In Example 4, eight types of information recording media 10-41 to 10-48 were produced with the recording layers having different thicknesses.

With respect to the information recording media 10-41 to 10-48, the repeated-rewriting performance and the deterioration in crystallization sensitivity with time were evaluated by the methods described later. The evaluation results are shown in Table 4.

TABLE 4

| Information Recording Medium No. | Thickness of Recording Layer [nm] | Rewritable Number of Times | Variation in Jitter Value [%] |
|---|---|---|---|
| 10-41 | 3 | E1 | E2 |
| 10-42 | 5 | C1 | C2 |
| 10-43 | 7 | A1 | B2 |
| 10-44 | 9 | B1 | B2 |
| 10-45 | 11 | B1 | A2 |
| 10-46 | 13 | B1 | A2 |
| 10-47 | 15 | C1 | A2 |
| 10-48 | 17 | D1 | A2 |

As shown in Table 4, the use of Mn as the element M allowed information recording media to be obtained which were excellent in the repeated-rewriting performance and were deteriorated less in crystallization sensitivity with time. Particularly, these two characteristics were excellent when the thickness of the recording layer was 7 nm to 13 nm. In addition, random signals recorded before the leave-standing step were reproduced without the variation in jitter value. As a result, it was confirmed that there also was no problem in archival property.

Example 5

In Example 5, the description is directed to an example in which the information recording medium 10 was produced with the content of the element M and the Sn content being varied.

Information recording media were produced as in Example 1 except that Cr was used as the element M and the Sn content was varied. The recording layers were formed using a material expressed by a composition formula of $[(Ge, Sn)_4Sb_2Te_7]_{95}Cr_5$. The Sn content was varied from 0 atom.% to 25 atom.% and the Ge content from 29 atom.% to 4 atom.%. The thickness of the recording layer was set to be 9 nm.

With respect to a plurality of information recording media thus produced, the repeated-rewriting performance and the deterioration in crystallization sensitivity with time were evaluated by the methods described later. The ranges in which particularly excellent results were noted as a result of the evaluations were indicated by the mark * in Table 5.

TABLE 5

| Cr Content | Sn Content [atom. %] | | | | | | | |
|---|---|---|---|---|---|---|---|---|
| [atom. %] | 0 | 2 | 5 | 7 | 10 | 15 | 20 | 23 | 25 |
| 0 | | | | | | | | | |
| 2 | | | * | * | * | * | | | |
| 5 | | | | * | * | * | * | | |
| 7 | | | | | * | * | * | | |
| 10 | | | | | | * | * | | |
| 15 | | | | | | | * | | |
| 20 | | | | | | | | | |
| 23 | | | | | | | | | |
| 25 | | | | | | | | | |

The mark * denotes that the rewritable number of times was at least 100000 and the variation in jitter value was not more than ±2%. As shown in Table 5, the use of a material containing 5 atom.% to 20 atom.% Sn and 2 atom.% to 15 atom.% Cr allowed information recording media to be obtained which were excellent in the repeated-rewriting performance and were deteriorated less in crystallization sensitivity with time.

In addition, the same test was carried out using Mn or Al as the element M. As a result, the same results were obtained as in the information recording media using Cr as the element M.

Furthermore, the same test was carried out using Ag and Mn, Ag and Al, or Ag and Cr as the element M. The Ag content was set to be 1 atom.%. As a result, information recording media with excellent characteristics were obtained when the Sn content was set to be 5 atom.% to 20 atom.% and the content of Mn, Al, or Cr 1 atom.% to 13 atom.%.

Example 6

The description in Example 6 is directed to an example in which the information recording medium 20 was produced.

First, a polycarbonate substrate (with a thickness of 1.1 mm) with a spiral guide groove formed at its one surface was prepared as the first substrate 21. Then, a Ag alloy layer (the reflective layer 16, with a thickness of 80 nm), a Te compound layer (the optical absorption compensation layer 15, with a thickness of 20 nm), a ZnS—SiO$_2$ layer (the second protective layer 12b, with a thickness of 11 nm), a Ge—N layer (the second interface layer 13b, with a thickness of 3 nm), a recording layer (the recording layer 14), a Ge—N layer (the first interface layer 13a, with a thickness of 5 nm), and a ZnS—SiO$_2$ layer (the first protective layer 12a, with a thickness of 60 nm) were formed sequentially on the polycarbonate substrate by the sputtering method. The thicknesses of the first protective layer 12a and the second protective layer 12b were adjusted so that a larger signal amplitude (variation in quantity of reflected light) in a wavelength of 405 nm and a larger quantity of incident light on the recording layer were obtained. These thicknesses were determined using the calculation based on the matrix method.

The recording layer was formed using a material expressed by a composition formula of $[(Ge, Sn)_4Sb_2Te_7]_{95}Mn_5$. The Ge and Sn contents were set to be 19 atom.% and 10 atom.%, respectively.

Afterward, an ultraviolet curable resin was applied to the first protective layer to form the adhesive layer 17. Finally, a second substrate (the second substrate 22, with a thickness of 0.1 mm) was allowed to adhere to the first protective layer, which then was irradiated with ultraviolet rays. Thus, the first protective layer and the second substrate were bonded.

In Example 6, after the second substrate was bonded, the whole information recording medium was irradiated with laser beams, so that the whole recording layer was crystallized. Thus, an information recording medium according to Example 6 was produced. In Example 6, seven types of information recording media 20-1 to 20-7 having recording layers with different thicknesses were produced. With respect to these information recording media, the repeated-rewriting performance and the deterioration in crystallization sensitivity with time were evaluated by the evaluation methods described later. In Example 6, high density recording was carried out using laser beams with a wavelength of 405 nm and an objective lens with a NA of 0.8 and thus the characteristics were evaluated. The evaluation results are shown in Table 1.

TABLE 6

| Information Recording Medium No. | Thickness of Recording Layer [nm] | Rewritable Number of Times | Variation in Jitter Value [%] |
|---|---|---|---|
| 20-1 | 5 | E1 | E2 |
| 20-2 | 7 | B1 | C2 |
| 20-3 | 9 | B1 | B2 |
| 20-4 | 11 | B1 | B2 |
| 20-5 | 13 | B1 | B2 |
| 20-6 | 15 | C1 | B2 |
| 20-7 | 17 | E1 | E2 |

As shown in Table 6, it was possible to obtain information recording media that were excellent in repeated-rewriting performance and were deteriorated less in crystallization sensitivity with time in high density recording. It is conceivable that this is because part of Ge of $Ge_4Sb_2Te_7$ was substituted by Sn and Mn was added as the element M.

In addition, the same test was carried out using Cr or Al as the element M and the same results were obtained as in the information recording media produced using Mn as the element M.

Moreover, the same test was carried out using Ag and Mn, Ag and Al, or Ag and Cr as the element M. The Ag content was set to be 1 atom.%. The content of Mn, Al, or Cr was set to be 4 atom.%. As a result, the same results were obtained as in the information recording media produced using Mn as the element M.

Evaluation of Repeated-Rewriting Performance

The following description is directed to a method of evaluating the repeated-rewriting performance.

Figure 3:
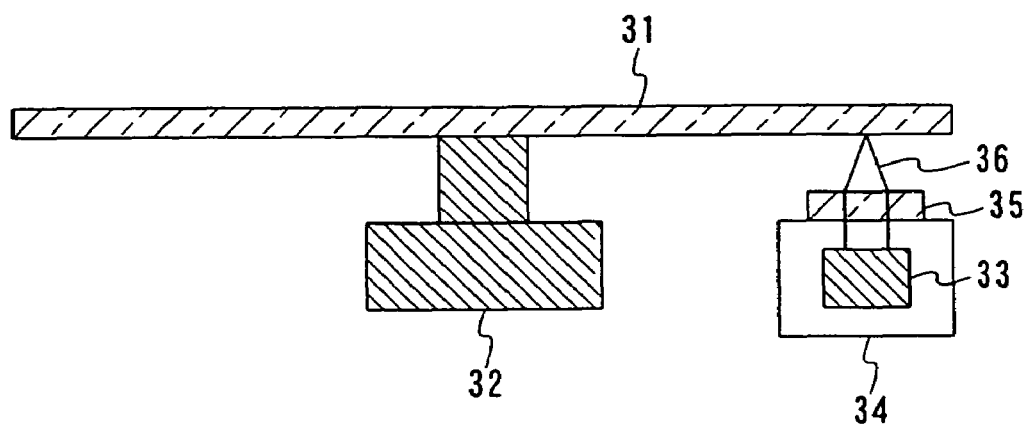
FIG. 3 is a schematic view of a recording/reproducing device used for evaluation of information recording media.

FIG. 3 shows a schematic view of a recording/reproducing device used for the evaluation. The recording/reproducing device includes a spindle motor 32 for revolving an information recording medium 31, an optical head 34 provided with a semiconductor laser 33, and an objective lens 35. Laser beams 36 emitted from the semiconductor laser 33 are converged by the objective lens 35 and a recording layer of the information recording medium 31 is irradiated therewith. The information recording media produced in the examples are used as the information recording medium 31.

In the evaluations in Examples 1 to 5, a semiconductor laser 33 with a wavelength of 660 nm and an objective lens 35 with a numerical aperture of 0.6 were used, and the linear velocity was set to be 8.2 m/sec. In the evaluation in Example 6, a semiconductor laser 33 with a wavelength of 405 nm and an objective lens 35 with a numerical aperture of 0.8 were used, and the linear velocity was set to be 8.6 m/sec.

For the evaluation of the repeated-rewriting performance, random signals were recorded while the laser beams 36 were modulated to have a high output peak power Pp and a low output bias power Pb. Then, the jitter value between leading edges of recording marks and that between end edges of the recording marks were measured, and they were averaged. Thus, the mean jitter value was calculated. The repeated-rewriting performance was evaluated in terms of the rewriting number of times (the rewritable number of times in the tables) before the mean jitter value reached 13% when signals were recorded repeatedly using the laser beams 36 with Pp and Pb. When the information recording medium is to be used as an external memory of a computer, the preferable rewritable number of times is at least 100000. When the information recording medium is to be used as an image/voice recorder, the rewritable number of times of 10000 is considered as being sufficient.

Evaluation of Deterioration in Crystallization Sensitivity with Time

The following description is directed to a method of evaluating the deterioration in crystallization sensitivity with time.

Initially, random signals were recorded on an information recording medium ten times by the same method as in the evaluation of the repeated-rewriting performance, and the jitter value between leading edges of recording marks and that between end edges of the recording marks were measured.

Next, the information recording medium was left in an environment with a temperature of 90° C. and a relative humidity of 20% for 24 hours (a leave-standing step). Afterward, the signals recorded before the leave-standing step were overwritten by random signals once. Then, the jitter value between leading edges of recording marks and that between end edges of the recording marks were measured.

The "Variation in Jitter Value [%]" in the tables is given by (Variation in Jitter Value [%])≦(Jitter Value After Leave-Standing Step [%])—(Jitter Value Before Leave-Standing Step [%]).

When the crystallization sensitivity does not vary before and after the leave-standing step, the variation in jitter value hardly occurs. On the contrary, when the crystallization sensitivity decreases after the leave-standing step, the variation in jitter value increases. Therefore, it can be understood that the less the jitter value varies, the less the crystallization sensitivity is deteriorated with time. Practically, it is preferable that the worse one of the variations in jitter value between leading edges and end edges is not more than +2%.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A method of manufacturing an information recording medium including a substrate and a recording layer disposed above the substrate, the method comprising forming the recording layer by a vapor deposition method,
    wherein the recording layer comprises, as constituent elements, Ge, Sb, Te, Sn, and at least one element M selected from Ag, Al, Cr, Mn, and N and is transformed in phase reversibly between a crystal phase and an amorphous phase by an irradiation of an energy beam, and
    the recording layer is formed of a material expressed by a composition formula of $[(Ge, Sn)_A Sb_2 Te_{3+A}]_{100-B} M_B$, where $0<A\leq10$, $0<B\leq20$, such that A and B each represent an atomic percent and M is at least one of Ag, Al, Cr, Mn or N.

2. The method of manufacturing an information recording medium according to claim 1, wherein the vapor deposition method is at least one method selected from a vacuum evaporation method, a sputtering method, an ion plating method, a chemical vapor deposition, and a molecular beam epitaxy.

3. The method of manufacturing an information recording medium according to claim 1, wherein the vapor deposition method is a sputtering method using a gas comprising at least one gas selected from nitrogen gas and oxygen gas and one rare gas selected from argon and krypton.

4. The method of manufacturing an information recording medium according to claim 1, wherein the recording layer is deposited at a deposition rate of 0.5 nm/sec to 5 nm/sec.

5. The method of manufacturing an information recording medium according to claim 1, wherein the recording layer has a thickness of 5 nm to 15 nm.

* * * * *